US009226296B2

(12) United States Patent
Libin et al.

(10) Patent No.: US 9,226,296 B2
(45) Date of Patent: *Dec. 29, 2015

(54) METHOD AND APPARATUS PROVIDING COORDINATED RADIO FREQUENCY CHANNEL ALLOCATION USING AUTHORIZED CHANNEL ASSIGNMENT AND CONTROLLED ACCESS

(71) Applicants: Louis H. Libin, Woodmere, NY (US); Aldo G. Cugnini, Long Valley, NJ (US)

(72) Inventors: Louis H. Libin, Woodmere, NY (US); Aldo G. Cugnini, Long Valley, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 14/726,695

(22) Filed: Jun. 1, 2015

(65) Prior Publication Data

US 2015/0264691 A1    Sep. 17, 2015

Related U.S. Application Data

(63) Continuation of application No. 13/670,666, filed on Nov. 7, 2012, now Pat. No. 9,078,248.

(60) Provisional application No. 61/628,889, filed on Nov. 8, 2011.

(51) Int. Cl.
| | |
|---|---|
| *H04B 17/00* | (2015.01) |
| *H04W 72/00* | (2009.01) |
| *H04B 7/00* | (2006.01) |
| *H04W 72/04* | (2009.01) |
| *H04W 28/26* | (2009.01) |
| *H04W 72/08* | (2009.01) |

(52) U.S. Cl.
CPC .......... *H04W 72/0453* (2013.01); *H04W 28/26* (2013.01); *H04W 72/0406* (2013.01); *H04W 72/082* (2013.01)

(58) Field of Classification Search
CPC .................................. H04B 1/04; H04W 72/02
USPC .................................. 455/509, 507, 501, 450
See application file for complete search history.

(56) References Cited

U.S. PATENT DOCUMENTS

| | | | | |
|---|---|---|---|---|
| 6,240,083 | B1* | 5/2001 | Wright et al. | 370/348 |
| 6,522,660 | B1* | 2/2003 | Mukaihara et al. | 370/443 |
| 7,408,907 | B2* | 8/2008 | Diener | 370/338 |
| 7,664,131 | B2* | 2/2010 | Chun et al. | 370/443 |
| 7,693,175 | B1* | 4/2010 | Benveniste | 370/447 |
| 8,102,822 | B2* | 1/2012 | Qin et al. | 370/337 |
| 8,135,400 | B2* | 3/2012 | Shao et al. | 455/434 |
| 8,583,114 | B2* | 11/2013 | Subramani et al. | 455/434 |
| 8,675,557 | B2* | 3/2014 | Le | 370/328 |
| 8,805,394 | B2* | 8/2014 | Ibrahim | H04W 72/082 455/452.1 |
| 9,078,248 | B2* | 7/2015 | Libin | H04W 72/0406 |
| 2005/0058151 | A1* | 3/2005 | Yeh | H04W 52/46 370/445 |
| 2008/0144493 | A1* | 6/2008 | Yeh | H04W 52/50 370/230 |
| 2008/0253341 | A1* | 10/2008 | Cordeiro et al. | 370/338 |
| 2008/0305755 | A1* | 12/2008 | Subramani et al. | 455/120 |
| 2010/0008347 | A1* | 1/2010 | Qin et al. | 370/345 |
| 2011/0032892 | A1* | 2/2011 | Bahl et al. | 370/329 |
| 2011/0085538 | A1* | 4/2011 | Feinberg | 370/343 |

(Continued)

*Primary Examiner* — Tilahun B Gesesse
(74) *Attorney, Agent, or Firm* — Michael J. Feigin, Esq.; Feigin & Associates, LLC

(57) ABSTRACT

An apparatus and method are provided for intermittent communication over at least one of a plurality of channels. The method includes receiving by the apparatus a reservation request from a user, detecting an available channel, generating a reservation signal on the available channel, receiving an activation request, and handing said available channel over to the user.

14 Claims, 8 Drawing Sheets

(56) References Cited

U.S. PATENT DOCUMENTS

| | | | |
|---|---|---|---|
| 2011/0149899 A1* | 6/2011 | Le | 370/329 |
| 2012/0008599 A1* | 1/2012 | Marin et al. | 370/336 |
| 2012/0115425 A1* | 5/2012 | Subramani et al. | 455/120 |
| 2013/0115889 A1* | 5/2013 | Libin | H04W 72/0406 455/67.11 |
| 2013/0252657 A1* | 9/2013 | Kafle | H04W 52/367 455/522 |
| 2013/0310058 A1* | 11/2013 | Ibrahim | H04W 72/082 455/452.1 |
| 2014/0315567 A1* | 10/2014 | Ibrahim | H04W 72/082 455/452.2 |
| 2015/0063327 A1* | 3/2015 | Barriac | H04W 56/0005 370/337 |
| 2015/0264691 A1* | 9/2015 | Libin | H04W 72/0406 455/452.2 |

* cited by examiner

METHOD AND APPARATUS PROVIDING COORDINATED RADIO FREQUENCY CHANNEL ALLOCATION USING AUTHORIZED CHANNEL ASSIGNMENT AND CONTROLLED ACCESS

CROSS REFERENCE TO RELATED APPLICATIONS

This application is a continuation of U.S. application Ser. No. 13/670,666, filed Nov. 7, 2012, now pending, which claims the benefit of U.S. Provisional application No. 61/628,889, filed Nov. 8, 2011, both entitled Method and Apparatus Providing Coordinated Radio Frequency Channel Allocation, Using Authorized Channel Assignments and Controlled User Access. The disclosure of each patent application identified above is incorporated herein by reference in its entirety.

FIELD OF INVENTION

This invention pertains to a method and apparatus for allocating a channel temporarily to the user wherein once an available channel is detected, a carrier is generated on that channel until the user is ready to transmit or receive signals.

BACKGROUND OF THE INVENTION

Radio frequency channel coordination involves plans and procedures followed by users of a common band of radio frequencies to minimize and control potential conflict and interference between systems. A key aspect of the procedure involves cooperative radio frequency planning. Because there are so many variables involved with frequency coordination and planning, even with good cooperation, mistakes can occur that impact other users, or there can be intentional channel misuse. Historically, there has been a high occurrence of these kinds of problems at large events.

Radio frequency systems must be designed in such a manner as to minimize frequency allocation issues and to negate objectionable interference with other existing or planned systems using the same or affected frequency bands. This coordination is facilitated by sharing coordination data among users, so that accurate and up-to-date information is available with which estimates of potential interference can be made, even during the design stage of a temporary system. Radio frequency interference studies and frequency coordination are necessary not only when designing a new system, but also when the potential interference effects of other users' radio transmission proposals on existing and planned temporary systems is considered. Thus, coordination is needed when one party develops and executes transmission plans as well as when reacting to other parties' plans.

The purpose of frequency coordination is to predict and control potential interference between devices. Radio frequency interference is caused by the presence of a non-desired interfering signal in a channel being used by a desired signal (linear or co-channel interference), as well as by the mixing of one or more non-desired interfering signals with the desired signal resulting in intermodulation products and added noise in the interfered system (non-linear interference). If not controlled to acceptable levels, interference can seriously degrade system usability, reliability and noise performance, thus rendering an important channel anywhere from noisy to useless.

The specific effects of interference to a given system are dependent on many factors, including but not limited to:

the modulation characteristics of the desired and interfering signals,
the bandwidths of the signals,
the mathematical relationship (such as intermodulation (IM) characteristics) between the two signals,
the extent of channel overlap or frequency separation between the two signals,
the signal strengths of the two signals,
the characteristics of the transmitters receivers, and antennas, and
the relative level of the interference signal with respect to the normal noise level of the interfered system.

The effect of radio frequency interference varies not only with the type of interfering signal, but also with the nature of the interfered (desired) signal. For example, in analog systems, voice signal interference into another voice channel generally results in crosstalk. The effects of this interference generally increase with the voice circuit loading on both the interfering and interfered channels. Interference to data signals may cause bit errors, with the effects of the interference more severe for more complex digital modulation schemes. Interference is most severe when the interfering channel shares the same frequency slot as the interfered channel, a situation referred to as "co-channel interference." Because channel filters are not perfect, interference can also occur between channels that do not overlap, especially in temporary situations. This "adjacent channel" interference may occur when channels are directly adjacent in frequency or, in some cases, when they are separated by an amount equivalent to several channel bandwidths.

The amount or level of noise resulting from interference is generally related to the received levels of the desired signal and the interfering signal. The ratio of these signals, referred to as the "carrier-to-interference" ratio (C/I), may be considered a radio frequency version of signal-to-noise ratio (S/N). In fact, C/I is directly related to baseband S/N in a multichannel analog system. High C/I values correspond to high S/N values. Since circuit noise levels are inversely proportional to S/N, it follows that high C/I values correspond to low interference noise levels. Another and perhaps more direct way of considering interference is to compare it to some absolute level of noise in the system, rather than dealing strictly in ratios. Both ratios and absolute levels are used in different situations to control interference.

Several parts of the FCC Rules and Regulations contain requirements and guidelines concerning prior coordination. Part 2 of the FCC Rules contains the table of FCC frequency allocations as well as definitions of various types of emissions and methods of calculating signal bandwidths. Besides satisfying an FCC requirement, frequency coordination with other radio users is conducted basically for two reasons: (1) to determine if a system is technically feasible and acceptable to other users from an interference standpoint; and (2) to provide interference protection for the proposed system until applications are filed with the FCC. The FCC Rules generally state that coordination involves two elements: notification and response. (Section 21.100(d) of the FCC Rules contains the basic procedural guidelines for coordination.)

For permanent systems, once preliminary design of a new radio system is complete, frequency coordination involves the following: (1) distribution of a prior coordination notification to all parties who could be affected by the new proposal; (2) analyses by those parties of potential interference (both caused by and caused to the proposed system); and (3) responses by those parties, generally stating agreement or objection to the proposal on the basis of their analyses of potential interference. If all parties agree, the coordination process is considered complete and the proposed system is given interference protection. Note that prior coordination does not provide absolute assurance that interference will not occur, because of the many variables involved.

If certain parties object to the proposed system because of anticipated interference problems, the originating coordinator may find the problems insurmountable and terminate the proposal, or they may be able to modify the proposal to resolve the problems. If modifications are possible, a second coordination notification is sent to all parties to determine if the proposed system, as modified, is acceptable. Sometimes a proposed system may be acceptable to a given party as initially coordinated, but subsequent modifications make it unacceptable. The process of modification and subsequent notification and response may continue for some time until the proposal becomes acceptable to all concerned parties.

One situation that must be considered is the one involving a successfully coordinated temporary system that, when constructed, causes harmful interference that was not anticipated. When this type of problem occurs, the Commission initially encourages the parties involved to attempt to clear the problem jointly, for example, by changing antenna heights, frequencies, or signal polarizations, if possible. If all reasonable efforts prove unsuccessful, the FCC may rely on the "first come, first served" principle and require the "last one in" to correct the problem by any means necessary, including terminating operation.

Since its establishment of frequency coordination requirements and guidelines, the FCC has assumed an essentially passive role in day-to-day coordination and enforcement. The Commission staff is occasionally contacted to give its view on specific problems and procedures and to provide interpretations of the Rules. Day-to-day interaction among frequency coordinators is generally in accordance with an industry practice that has developed within the FCC's coordination guidelines.

Because of the complex nature of temporary frequency coordination and allocation, it is therefore useful to have a technology that can assist with or even automatically perform these functions for wireless device users.

SUMMARY OF THE INVENTION

Channel/frequency coordination and reservation is very important for broadcast events such as news and sports, and other users, especially with the advent of white space sharing. Inherently, many carriers are intermittently used, so each channel needs to be protected. In many cases, the channels that need protection are part of a critical contribution circuit of a national or international network and thus need to be completely controlled.

When radio frequencies are temporarily assigned for planned special or ephemeral events, a customized, uniquely-modulated carrier signal is automatically sent from a transmission device, which physically reserves the channel until a control signal is sent to the device to remove the reserved carrier so that the user can make use of the channel for its intended purpose. When a frequency is assigned, there is no guarantee that another carrier will not come up in its place, mistakenly or otherwise.

The system described in this invention will, at the time of channel assignment, turn on a carrier to reserve the space and ensure that the frequency is not usable by unauthorized users. The system transmits modulated carriers using analog and/or digital modulation schemes with various bandwidths. When the authorized user intends to use their pre-registered carrier, the user sends an encrypted message to the controlling apparatus to turn off the reserved carrier or modify other operating characteristics, such as power, frequencies, and the like.

BRIEF DESCRIPTION OF THE DRAWINGS

The following detailed description will be better understood when read in conjunction with the appended drawings, in which there is shown one or more of the multiple embodiments of the present invention. It should be understood, however, that the various embodiments of the present invention are not limited to the precise arrangements and instrumentalities shown in the drawings.

DETAILED DESCRIPTION OF THE INVENTION

Figure 1:
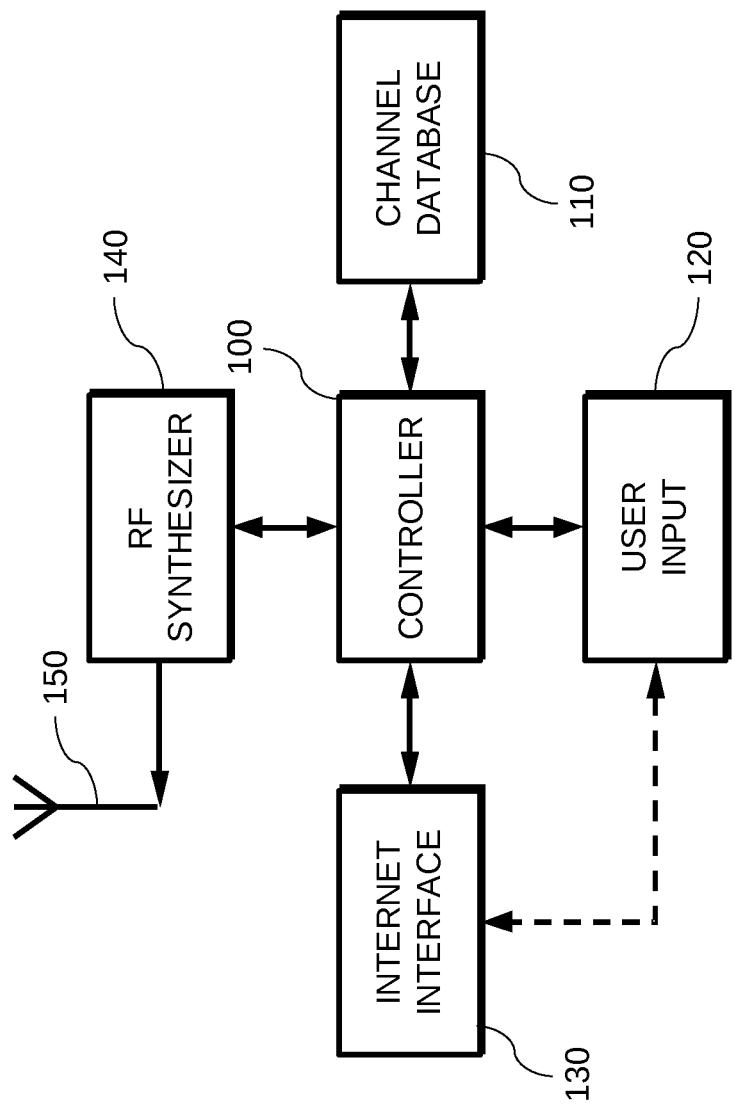
FIG. 1 shows a block diagram of an apparatus constructed in accordance with this invention.

Certain terminology is used herein for convenience only and is not to be taken as a limitation on the embodiments of the present invention. In the drawings, the same reference numbers and letters are employed for designating the same elements throughout the several figures.

The invention is based on one or more of the following and other technologies: RF transmission, Internet communications, telephony, analog, digital and hybrid communications, spread-spectrum communications, OFDM, MC-CDMA, cellular SMS and encryption.

Referring to FIG. 1, an apparatus constructed in accordance with this invention includes a Controller (100) that accesses a Channel Database (110) generated from User Input (120) supplied directly, or by means of an Internet Interface (130) or other connection. This Channel Database includes a list of available RF channels in a particular location. The Controller uses the Channel Database to control an RF Synthesizer (140) that broadcasts a reservation signal using an appropriate Antenna (150).

Figure 2:
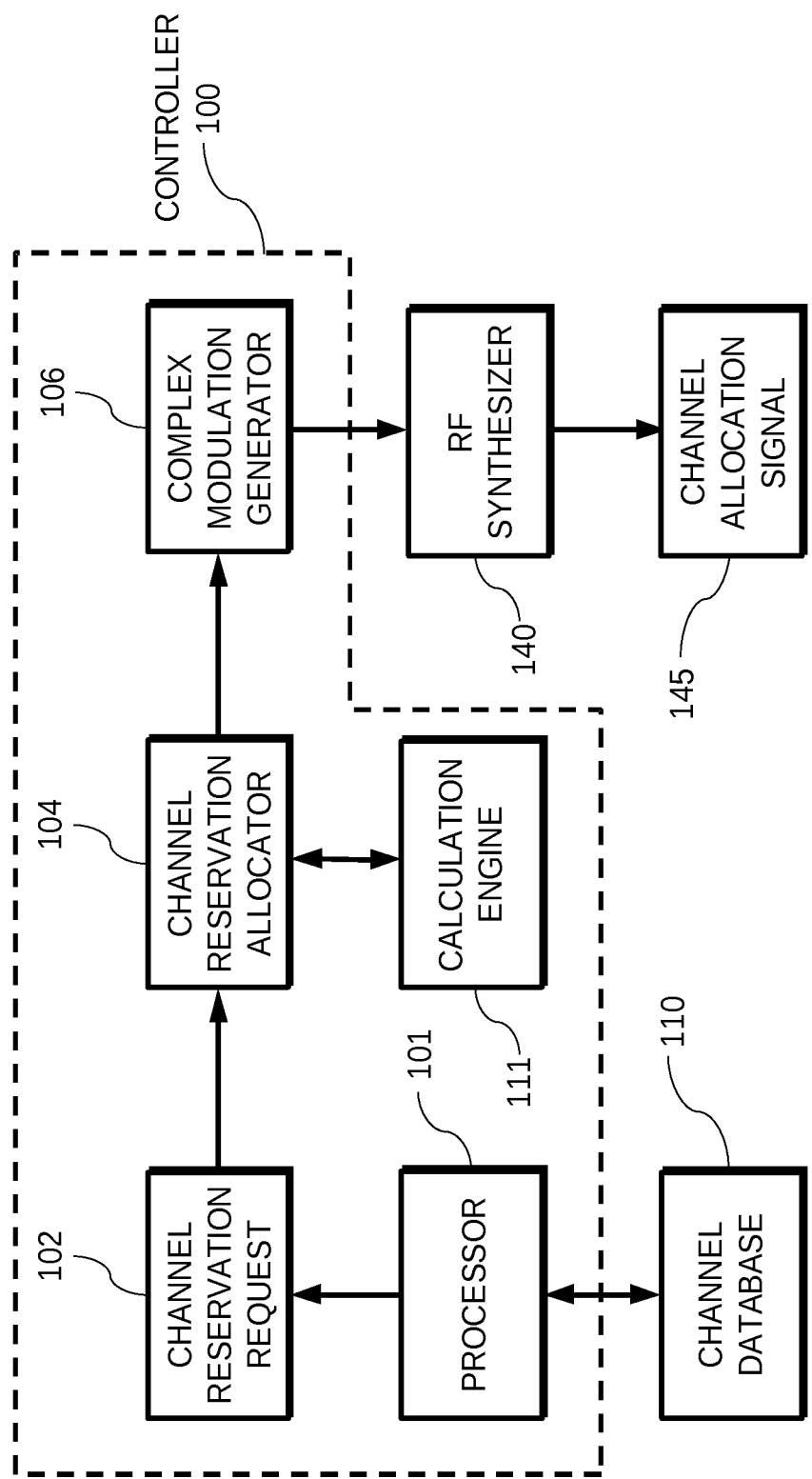
FIG. 2 shows details of the controller in the apparatus of FIG. 1, together with other controlled elements.

The signal broadcast by the RF Synthesizer is generated by the Controller (100) as shown in FIG. 2. A Processor (101) compares the Channel Database (110) with a Channel Reservation Request (102) that is input by the same (or a different) user, such Channel Reservation Request possibly having been input at some time after the Channel Database was input. (The Channel Reservation Request can also arrive by other means, such as cellular SMS, or the like.) In so doing, the Processor (101) makes use of a Channel Reservation Allocator (104) to differentiate channels that are already in use from channels that will be reserved for pending use.

The Channel Reservation Allocator (104) also makes use of a Calculation Engine (111) that takes interference mechanisms such as intermodulation and adjacent channel effects into account. This Channel Reservation Allocator is then used by a Complex Modulation Generator (106) to define a signal (including its power level and other characteristics) that will be broadcast by the RF Synthesizer (140). Such a system has a great advantage over manual allocation and reservation using actual field device production equipment, in that the latter can be hampered by battery life, equipment availability, and other factors; it can also allow for temporary and fast-changing equipment setups.

Figure 3:
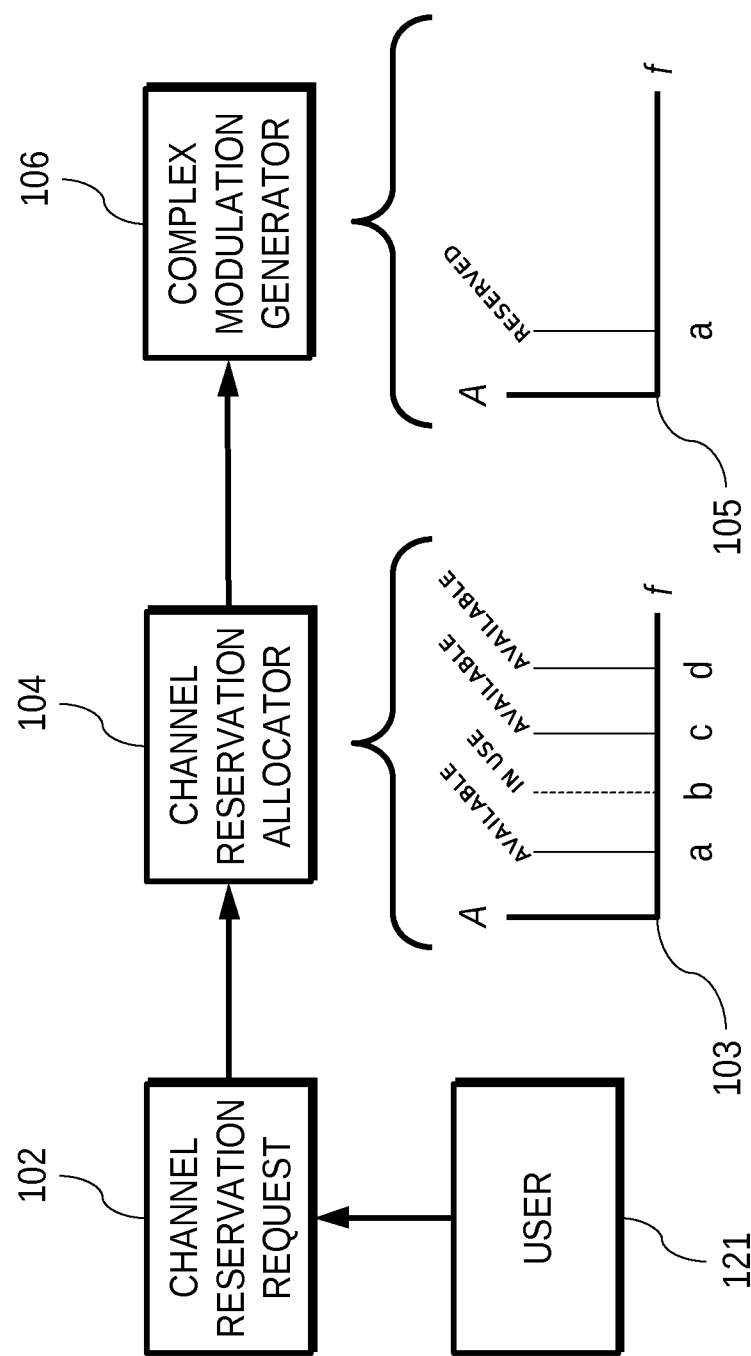
FIG. 3 shows the operation of the channel reservation allocator of FIG. 2.

The operation of the Channel Reservation Allocator (104) and the Complex Modulation Generator (106) is shown in more detail in FIG. 3. In this figure, we use an example to demonstrate the operation of the invention. The Channel Reservation Allocator (104) has determined that four channels are present in the spectrum, shown stylistically by letters "a" through "d" at Spectrum "abcd" (103), which is a graph of frequency (f) on the abscissa versus amplitude (A) on the ordinate. In this example, channels "a," "c" and "d" are available (vacant), but channel "b" is in use (occupied).

As a result of a Channel Reservation Request (102) that has been issued by a User (121), the Channel Reservation Allocator (104) determines that it will reserve channel "a" to satisfy the Channel Reservation Request. This reservation is made with a number of considerations including, but not limited to, allowed powers, co-channel interference, intermodulation interference, and the like. The Channel Reservation Allocator (104) thus instructs the Complex Modulation Generator (106) to define and transmit a signal that will be used to reserve the necessary channel, as shown stylistically by the Spectrum "a" (105).

Figure 4:
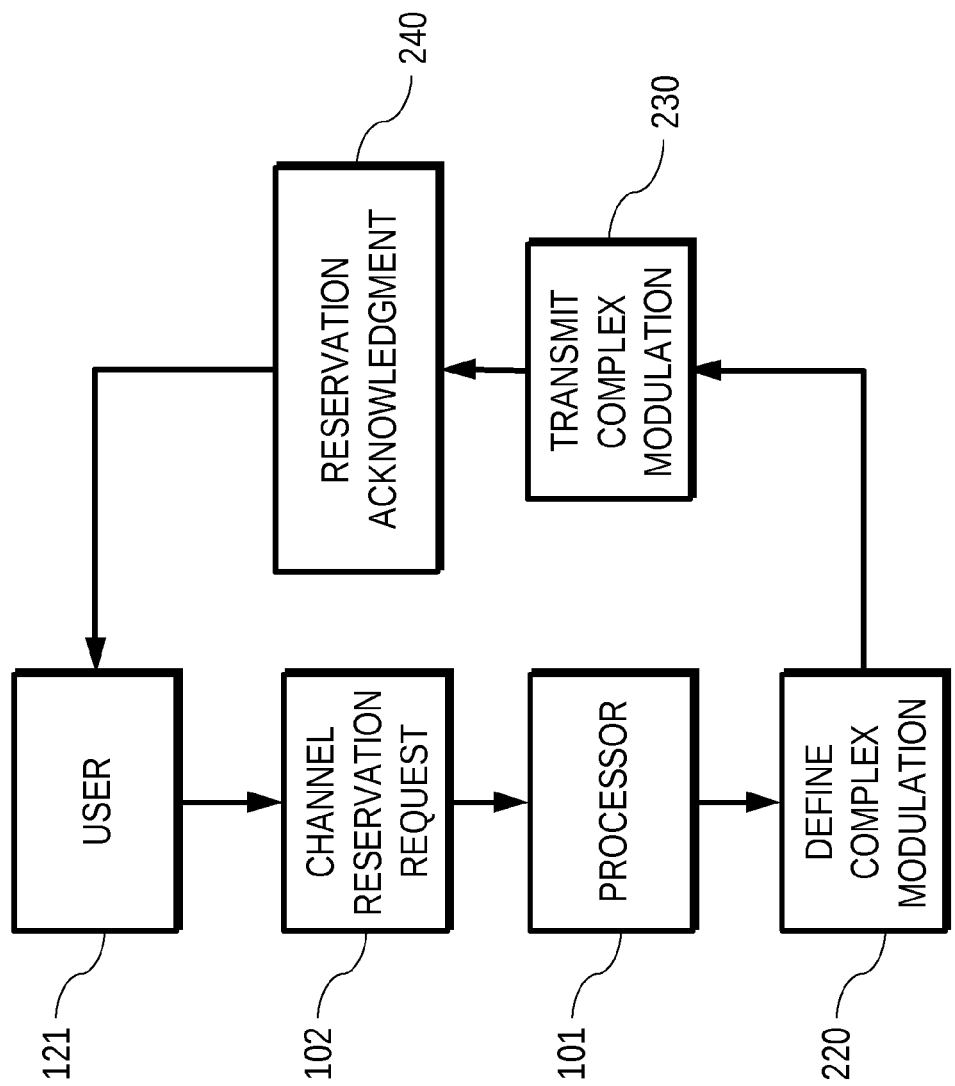
FIG. 4 shows further details of the channel allocation process.

This procedure is shown in further detail in FIG. 4. The User (121) issues a Channel Reservation Request (102), which is handled by the Processor (101), which then proceeds to Define Complex Modulation (220) and then Transmit Complex Modulation (230) as a result. The Processor (101) then sends a Reservation Acknowledgment (240) to the User. The channel is thus reserved for the user.

Figure 5:
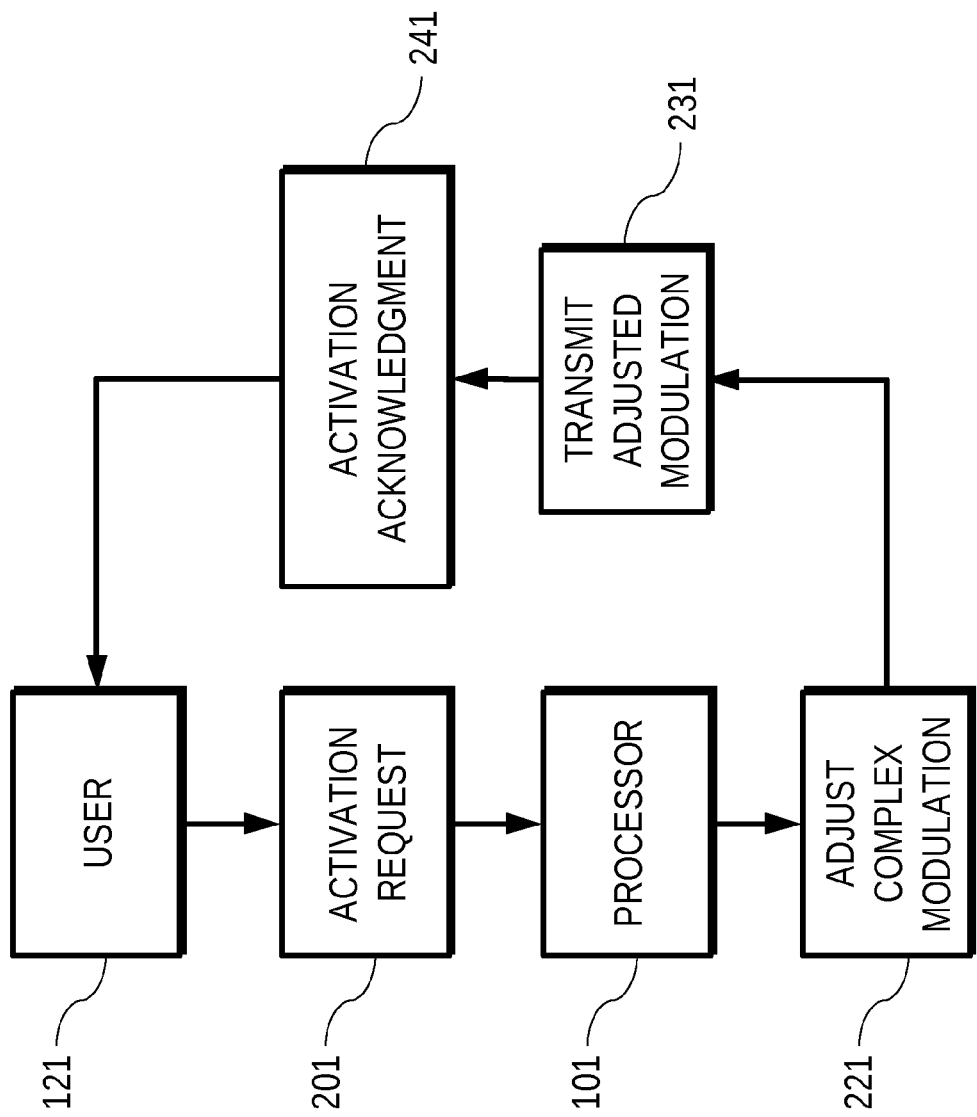
FIG. 5 shows details of the process for generating a reservation carrier signal.

When the user is ready to energize their actual transmission equipment, the user sends a special message in the form of an Activation Request (201) to the Processor (101), as shown in FIG. 5, upon which reception the Processor (101) then instructs the Complex Modulation Generator (106) to stop transmitting the signal shown stylistically by the Spectrum "a" (105) that was used to reserve the necessary channel; this process is shown as Adjust Complex Modulation (221) and Transmit Adjusted Modulation (231). The Controller then sends an Activation Acknowledgement (241) to the User, instructing the User that it is appropriate for the User to now energize their actual transmission equipment.

Figure 6:
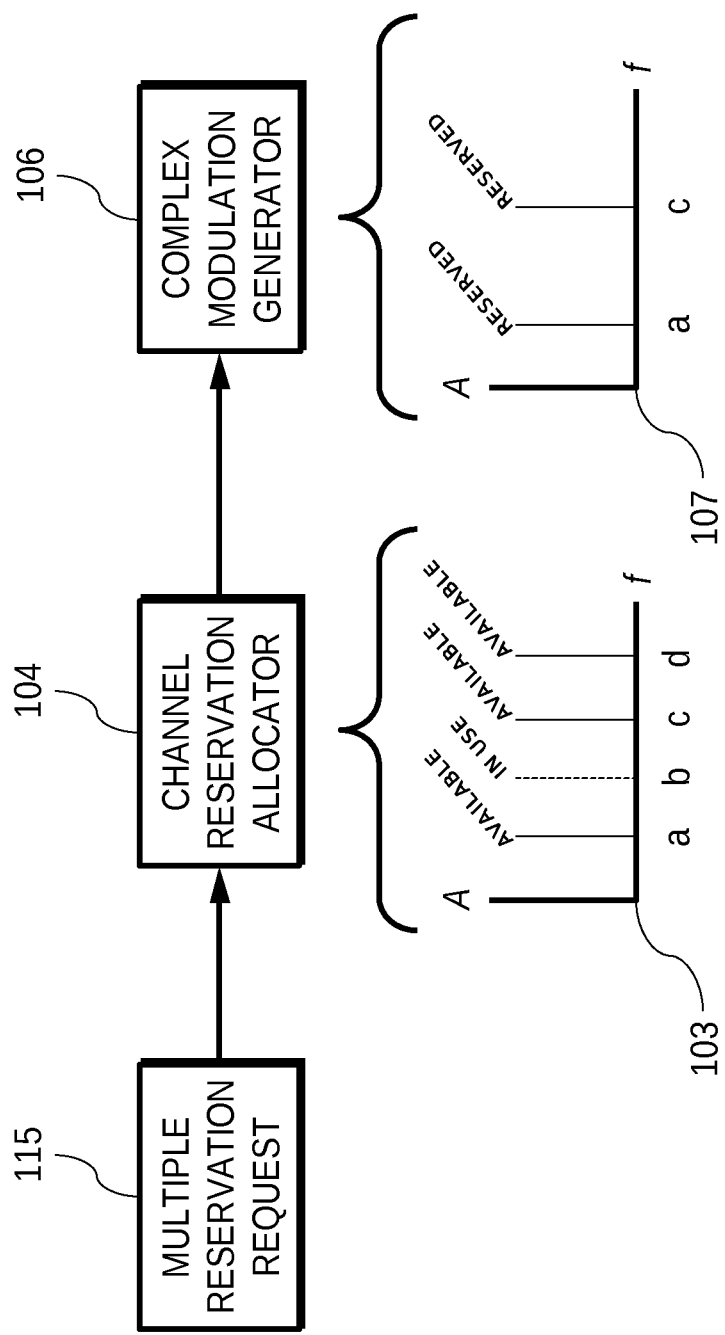
FIG. 6 shows details of a process for allocating and reserving a plurality of channels to a plurality of users.

A similar, although more complicated, situation is shown in FIG. 6. As in the previous example, channels "a," "c" and "d" are available, and channel "b" is in use. In this new example, however, a Multiple Reservation Request (115) has been issued, in this case by two users, so the Channel Reservation Allocator (104) determines that it will reserve two channels "a" and "c" to satisfy the Multiple Reservation Request (115). As a result, the Channel Reservation Allocator (104) instructs the Complex Modulation Generator (106) to define a different signal that will be used to reserve the necessary channel, as shown stylistically by the Spectrum "ac" (107). Upon transmission of this signal, the Channel Reservation Allocator (104) then informs the two users that their channels have been reserved.

Figure 7:
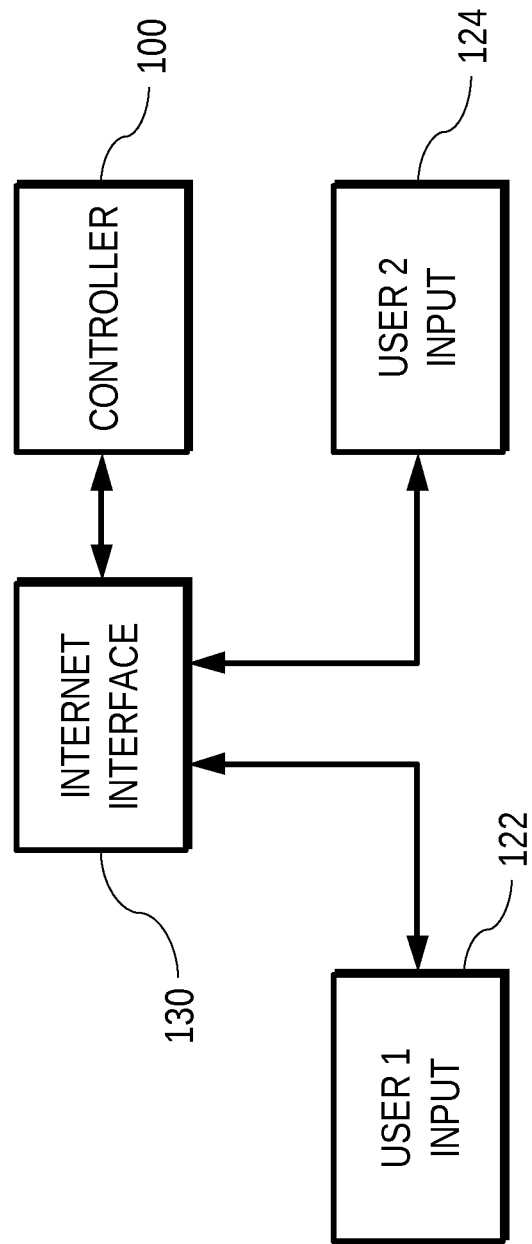
FIG. 7 shows details of the process for handing two allocated channels over to two users.
Figure 8:
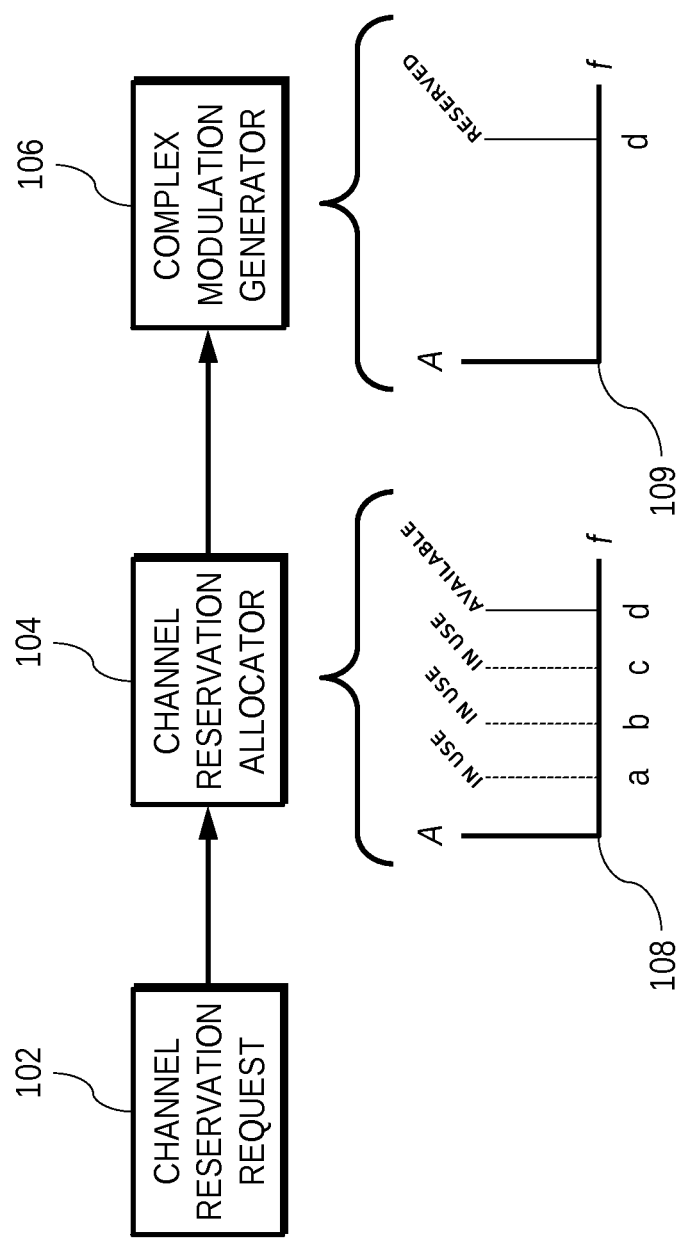
FIG. 8 shows the operation of the complex modulation generator.

When the operators of the equipment are ready to energize their respective transmitters, they each send a secure, custom use request to the Controller (100), as shown by User 1 Input (122) and User 2 Input (124) in FIG. 7. The Controller (100) then updates the Channel Reservation Allocator (104) to reflect that the channels "a" and "c" are now in active use by the users, in addition to the previously allocated (and in-use) channel "b", as shown in FIG. 8. The Complex Modulation Generator (106) then changes its output to reflect the new situation, and sends an appropriate Activation Acknowledgement (241) to the users. In this example, we also show the result of a new Channel Reservation Request (102), allocated as channel "d," and shown stylistically as Spectrum "d" (109). Note that the process of modifying the Complex Modulation Generator (106) can take several steps, not all shown in the example, as different users reserve channels and prepare to energize their transmitters.

A typical use case, incorporating elements of the invention, can now be described.

1. A temporary event is announced.
2. A Frequency Coordinator is assigned for the event.
3. Prior to the event, the Chief Engineer (CE) of a local TV station assigns two crews to cover the event and associated pre and post events. (This process may be replicated for any number of TV stations, radio stations and other related organizations.)
4. Prior to the event, the Frequency Coordinator and CE have synchronized databases listing equipment identification codes and operational characteristics of the equipment, such as output power, output power ranges, frequency capability, modulation parameters, and the like.
5. Each crew has a field device system that is frequency agile. In this example, the field devices are wireless microphones, but other similar transmitting devices could be used.
6. Crew A has a wireless microphone system that can operate in UHF channel 40 to 45 (626 MHz to 662 MHz).
7. Crew B has a wireless microphone system that can operate in UHF channels 20 to 25 (506 MHz to 542 MHz).
8. The Chief Engineer submits a list, containing the identification codes of the two wireless microphone systems, to the frequency coordinator via e-mail.
9. Using the existing local database, in conjunction with any other potential user of the same spectrum, the Frequency Coordinator makes a determination of:
    a. the best possible UHF Channel for each wireless microphone,
    b. the best possible sub-channel within the UHF channel for each wireless microphone, based on first-adjacent channel interference, second- and third-order intermodulation products, and other factors.
10. The Frequency Coordinator then communicates with the CE, via e-mail or other means, identifying the specific frequencies the CE has been assigned, to assure that both the wireless microphones and the receivers that will be used are physically capable of being tuned to those exact channels (for example, the assignment may be for channel 510.530 MHz, but the equipment might only tune to 510.525 MHz).
11. The CE then approves the channels, or replies with a negative response, in which case the Frequency Coordinator makes a new assignment.
12. If the channel assignments will work for all the CE's equipment, the assignment is valid.
13. The Frequency Coordinator then sends a verification e-mail to the CE, with an individual, unique text message code. The code is to be used just prior to the CE powering up his wireless microphones.
14. The Frequency Coordinator immediately enters the validated frequencies into the reservation system, and the two frequencies are now considered reserved; a carrier or similar signal that emulates the RF emission of the actual wireless microphones is turned on by the reservation system and "holds" the channels.
15. The process is then repeated for all the required channel reservations.

16. When the reservation system is loaded with all the correctly assigned channels, the reservation system is fully operational and is actively reserving all requested channels.

17. When the channel is operationally required by the actual wireless microphones, and a crew is ready to turn on their transmitters, they send a unique text message by cellular SMS or other means to the reservation system, which then turns off the reservation carriers and confirms the action by sending a confirmation message back to the crew.

18. If the crews are ready at different times, the interactions with the reservation system can occur at different times, with the reservation system making the appropriate changes to the reservation signals and acknowledgments.

OTHER EMBODIMENTS

1. The Reservation System may support the use of other transmitters and devices instead of the wireless microphones described herein.

2. In one embodiment, the function of the Frequency Coordinator may be provided by an automated process within or connected to the Reservation System.

3. In one embodiment, the Reservation Request can be one of a collection of codes, signaling the request to use one of a set of permutations of different devices, such as devices grouped by rights holders, and so forth.

4. In one embodiment, the Reservation Request can be one of a collection of codes, signaling the request to use one of a set of permutations of different device operating parameters, such as functionality, emission characteristics including power and frequency, and so forth.

5. In one embodiment, a multi-channel RF Recorder may be provided for applications covering the requisite band for both field-testing and performance testing.

6. In one embodiment, the Calculation Engine makes use of allocation algorithms that have been entered into its software.

7. In one embodiment, the Calculation Engine makes use of allocation algorithms that have been generated heuristically by the Channel Reservation Allocator, using operational history with different devices and situations.

8. In one embodiment, the Channel Reservation Allocator can reserve the use of multiple narrowband or wideband antennas in concert with the allocated transmitting devices.

9. In one embodiment, the signal emitted by the Complex Modulation Generator can have a unique or encrypted characteristic that can be monitored by a reserved user by taking a suitable measuring device, such as a hand-held spectrum analyzer with appropriate decrypting means, with which the user can ascertain that their frequency is appropriately reserved.

10. In one embodiment, the reservation system may use the actual coordinated field devices and/or antennas.

11. In one embodiment, the best possible sub-channel for each field device can be decided based on other factors not described herein.

12. In one embodiment, the Complex Modulation Generator (106) and the RF Synthesizer (140) may be realized as separate physical units.

13. In one embodiment, the Complex Modulation Generator (106) and the RF Synthesizer (140) may be integrated into a single physical unit.

14. In one embodiment, a single transmitter, consisting of an RF Synthesizer and other components, may transmit multiple carriers with varying powers and varying emission characteristics.

15. In one embodiment, a series of transmitters, consisting of multiple RF Synthesizers and other components, may be provided by one or more separate physical units.

16. In one embodiment, a tone and test generator may be provided in the Reservation System and may be controlled externally and programmed in a custom manner; the reservation signal is actually a test signal, to allow field testing of system components and various receive conditions.

17. In one embodiment, direction-finding software and hardware capability that can automatically identify and locate known or unknown transmitters may be provided by, to, or in conjunction with, the Controller (100).

18. In one embodiment, the system may be used in a regional (e.g., city-wide, or state-wide) configuration, as opposed to a local (e.g., stadium) configuration.

19. In one embodiment, frequency reservations may be requested either singularly or with a list, via multiple entry methods, including a wireless device.

20. In one embodiment, singular or multiple reports are generated, or may be stored in a secure database, that may provide a list various operational conditions, including the frequencies and powers used by the field devices, reception characteristics of the reserved channels, and other data.

While specific embodiments have been described in detail in the foregoing detailed description and illustrated in the accompanying drawings, it will be appreciated by those skilled in the art that various modifications and alternatives to those details could be developed in light of the overall teachings of the disclosure and the broad inventive concepts thereof. It is understood, therefore, that the scope of the present invention is not limited to the particular examples and implementations disclosed herein, but is intended to cover modifications within the spirit and scope thereof as defined by the appended claims and any and all equivalents thereof.

We claim:

1. A method for providing intermittent communication in a communication apparatus with a plurality of channels, said method comprising the steps of:
    receiving by said apparatus a reservation request from a user;
    detecting an available channel from said plurality of channels, wherein said step of detecting an available channel results in identifying one or more free channels based on at least one of the criteria selected from the group consisting of power allowed on said free channels, co-channel interference between the free channels and channels in use by others, and intermodulation interference;
    generating a reservation signal on said available channel by said apparatus;
    receiving an activation request; and
    providing said available channel to the user.

2. The method of claim 1, wherein said step of providing said channel includes discontinuing said reservation signal by said apparatus and generating an activation acknowledgment to the user to indicate that the user can start using the available channel.

3. The method of claim 1, wherein the interference is determined using estimates of potential interference.

4. The method of claim 3, wherein the estimates of potential interference are generated by using coordination data shared among users.

5. The method of claim 1, wherein said apparatus receives several reservation requests, finding by said apparatus one or more available channels and generating reservation signals on each of said available channels.

6. The method of claim 5, further comprising receiving activation requests and in response providing to the user one of said available channels in response to each of said activation requests.

7. An apparatus for providing communications to a user in a communication system having several channels of communication, the apparatus comprising:
   a controller receiving a reservation request from a user;
   a channel reservation allocator coupled to said controller, said channel reservation allocator being configured to identify an available channel suitable for the user, wherein said channel reservation allocator is configured to analyze several free channels based on predetermined criteria and to select said available channel from said free channels based on said criteria, wherein said criteria are selected from the group consisting of power allowed on said free channels by the system, co-channel interference between the free channels and channels in use by others, and intermodulation interference; and
   a signal generator coupled to the channel reservation allocator and configured to generate a reservation signal on the available channel;
   wherein the controller is further configured to provide the available channel to the user when the user is ready to use the available channel.

8. The apparatus of claim 7, wherein said controller is adapted to provide to the user the available channel in response to an activation request from the user.

9. The apparatus of claim 8, wherein in response to the activation request, said signal generator ceases generating said reservation signal.

10. The apparatus of claim 8, wherein said channel reservation allocator detects said available channel based on information from a database.

11. The method of claim 7, wherein the interference is determined using estimates of potential interference.

12. The method of claim 11, wherein the estimates of potential interference are generated by using coordination data shared among users.

13. The apparatus of claim 7, wherein said controller receives multiple reservation requests and said channel reservation allocator is configured to select one or more available channels in response to said multiple reservation requests.

14. The apparatus of claim 13, wherein said generator is configured to generate reservation signals on said available channels.

\* \* \* \* \*